(12) United States Patent
Arnold et al.

(10) Patent No.: US 6,637,571 B2
(45) Date of Patent: Oct. 28, 2003

(54) INPUT ENGAGING CLUTCH

(75) Inventors: Joseph E. Arnold, Lindstrom, MN (US); Ted J. Perron, White Bear Township, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 0 days.

(21) Appl. No.: 10/092,165

(22) Filed: Mar. 5, 2002

(65) Prior Publication Data

US 2003/0042099 A1 Mar. 6, 2003

Related U.S. Application Data

(60) Provisional application No. 60/316,493, filed on Aug. 31, 2001.

(51) Int. Cl.[7] ............................ F16D 13/08; F16D 41/20
(52) U.S. Cl. .................. 192/41 S; 192/55.4; 192/81 C
(58) Field of Search .......................... 192/41 S, 48.3, 192/48.92, 55.2, 55.4, 57, 58.4, 81 C, 30 V

(56) References Cited

U.S. PATENT DOCUMENTS

| | | | | |
|---|---|---|---|---|
| 3,394,785 A | * | 7/1968 | Crutcher III, et al. | 192/48.3 |
| 3,987,880 A | | 10/1976 | Holland-Letz et al. | 192/12 BA |
| 4,263,995 A | | 4/1981 | Wahlstedt | 192/35 |
| 4,433,765 A | | 2/1984 | Rude et al. | 192/41 S |
| 4,574,423 A | * | 3/1986 | Ito et al. | 16/85 |
| 4,830,151 A | * | 5/1989 | Numata | 188/290 |
| 5,031,745 A | | 7/1991 | Nishimura | 192/84 T |
| 5,133,437 A | | 7/1992 | Larson | 192/12 BA |
| 5,165,507 A | * | 11/1992 | Ohshima | 188/290 |
| 5,170,867 A | * | 12/1992 | Ojima et al. | 188/291 |
| 5,257,852 A | * | 11/1993 | Tsuneki et al. | 297/332 |
| 5,464,083 A | | 11/1995 | Arnold et al. | 192/223.4 |
| 5,697,125 A | | 12/1997 | Gannon | 116/342 |
| 5,950,783 A | * | 9/1999 | Cahill | 192/26 |

OTHER PUBLICATIONS

RPM Brochure entitled "Model SC Slip Device," for products sold Jul. 13, 2000.
RPM Brochure entitled "Models SA/SB High Inertia Slip Device," for products sold Jul. 13, 2000.
ACE Controls International website printout entitled "Rotary Dampers FRT/FRN–C2 and D2" (www.ace-controls.co.uk).
Karen Auguston Field, "Floating Armature Revs Up Clutch/Brake System," Design News, May. 17, 1999, pp. 57–60.

* cited by examiner

Primary Examiner—Richard M. Lorence
(74) Attorney, Agent, or Firm—Kinney & Lange P.A.

(57) ABSTRACT

A clutch has a rotatable input, a rotatable output, a spring and a damper mechanism. The rotatable input is capable of being rotated and of being held stationary. The spring is coupled to the input such that each time the input changes modes the spring changes states. The damper mechanism allows the spring to change states without rotating the input. The rotatable output is positioned relative to the spring such that the output synchronously rotates with the input when the spring is in the first state and rotates independently of the input when the spring is in the second state.

20 Claims, 8 Drawing Sheets

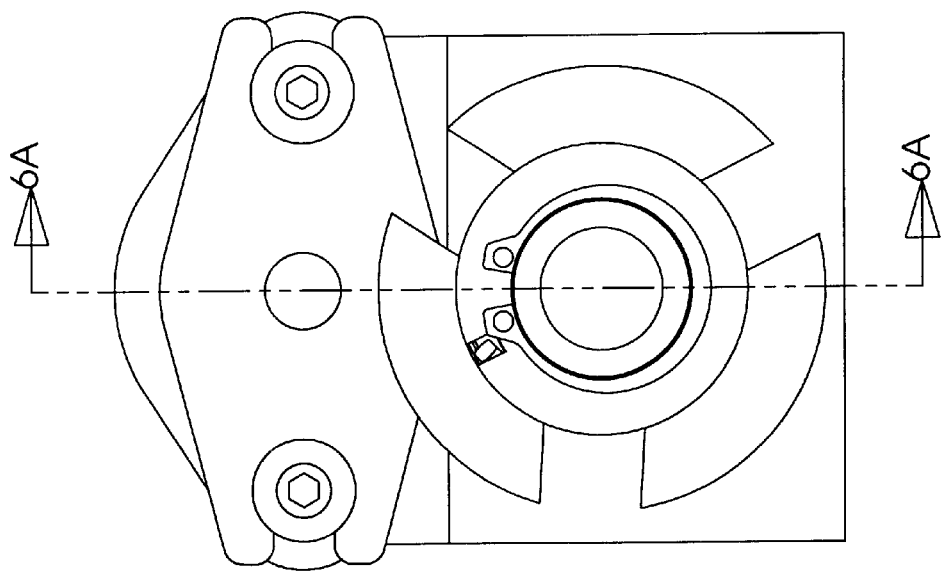
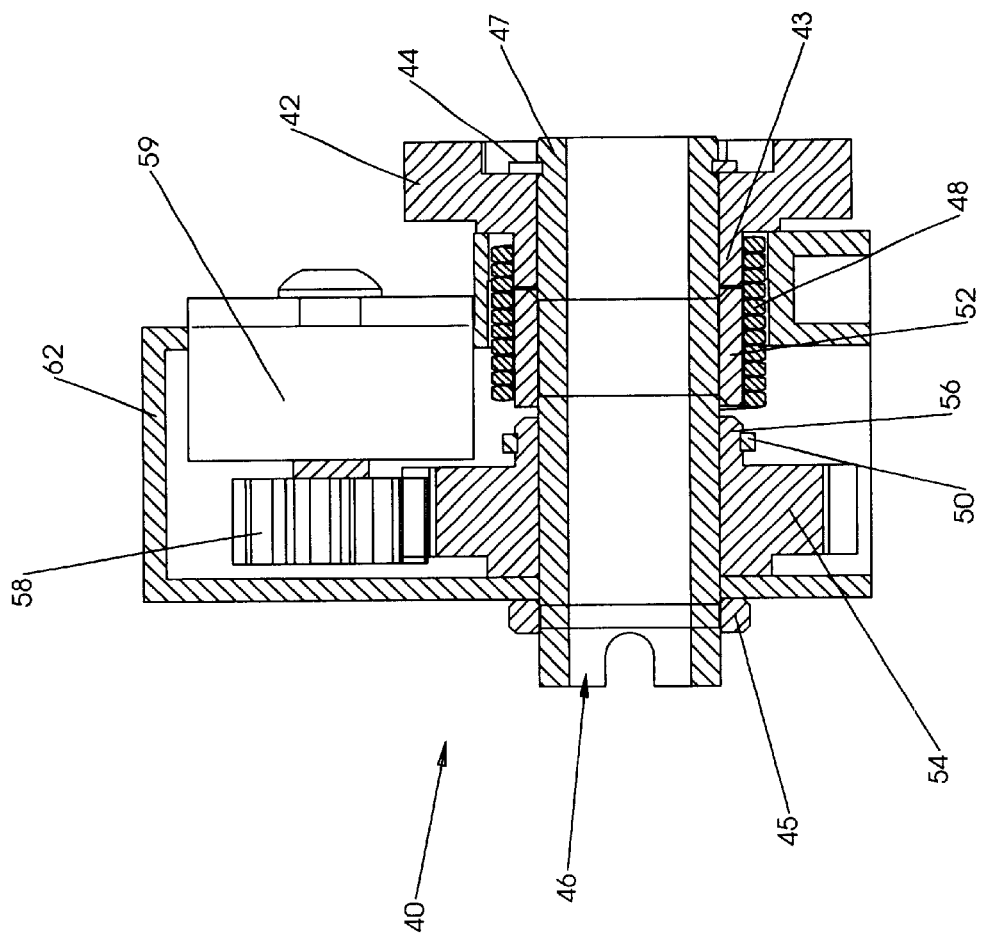

INPUT ENGAGING CLUTCH

CROSS-REFERENCE TO RELATED APPLICATION(S)

This application claims the priority from provisional U.S. Application No. 60/316,493, filed on Aug. 31, 2001 for INPUT ENGAGING CLUTCH for Joseph E. Arnold and Ted J. Perron, which is incorporated by reference herein.

BACKGROUND OF THE INVENTION

The present invention is an input engaging clutch wherein the clutch engages by turning the input to the clutch. When the input to the clutch stops turning, the clutch disengages the output from the input.

A typical electric wrap spring clutch includes an input, an output and a wrap spring, which transfers torque from the input to the output. Typically, a control piece is attached to the spring to controllably wrap the spring down onto a hub when a signal voltage is provided and the input is rotated, thereby engaging the hub. When the control signal is removed the control piece is freed allowing the spring to unwrap and disengage the hub. In some applications it is desirable to energize and de-energize the clutch each time the input to the clutch is energized and de-energized. In this configuration, however, the clutch must receive a control signal that will actuate the control piece to engage and disengage the clutch each time that the input is energized and de-energized. A clutch that allows engagement and disengagement of the input and output without requiring a control signal would be desirable in certain applications.

BRIEF SUMMARY OF THE INVENTION

The present invention is directed to an input engaging clutch. The input engaging clutch has a rotatable input that is capable of being rotated and capable of being held stationary. The clutch has a wrap spring that is coupled to the input. The wrap spring has an equilibrium state and rotates with the input when the input is rotating. The clutch also has a damper mechanism that is coupled to the spring such that the damper mechanism allows the spring to change from its equilibrium state to a flexed state—either wrapping open or wrapping down—when the input is rotated. In one embodiment, the clutch has a rotatable output that is positioned relative to the spring in such a way that the output rotates synchronously with the input when the spring is in its flexed state and rotates independently of the input when the spring is in its equilibrium state.

BRIEF DESCRIPTION OF THE DRAWINGS

FIG. 6A is a cross-sectional view of the input engaging clutch of FIG. 4.

FIG. 6B is an end view indicating the cross-section of FIG. 6A.

DETAILED DESCRIPTION

Figure 1:
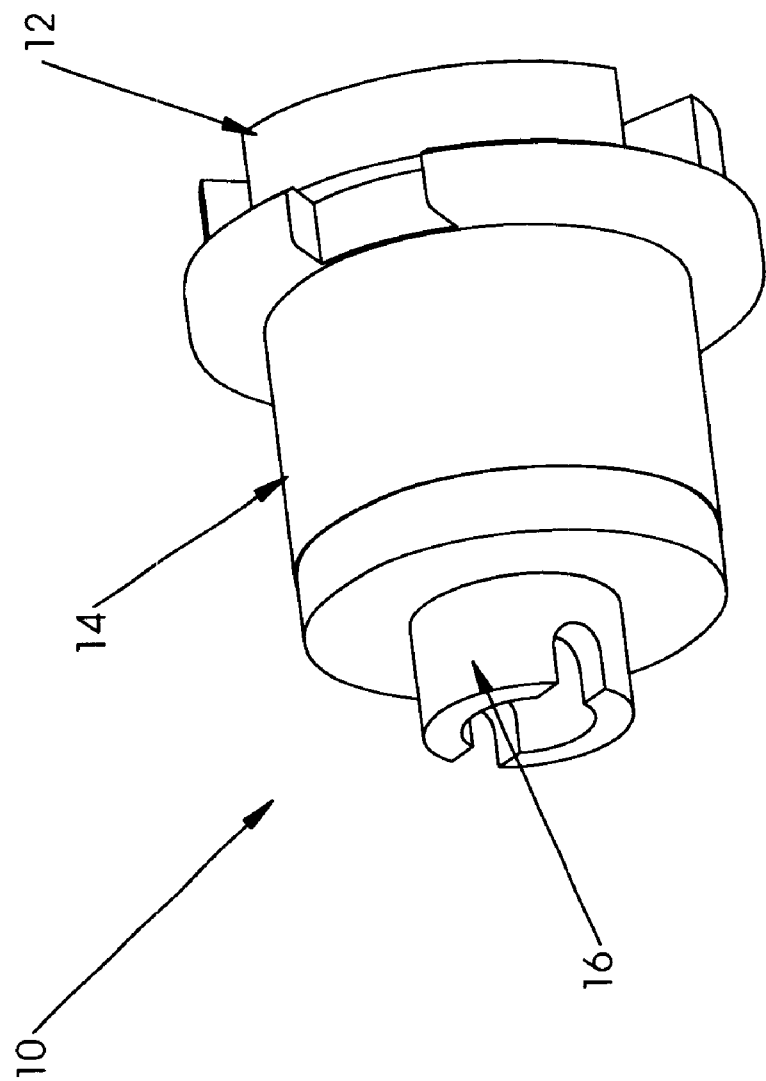
FIG. 1 is a perspective view of an input engaging clutch in accordance with the present invention.

FIG. 1 shows input engaging clutch 10 in accordance with the present invention. Input engaging clutch 10 includes input 12, case 14, and output 16. In operation, input engaging clutch 10 can alternatively engage and disengage input 12 to output 16. For example, input 12 has two modes: it will either be rotating in one direction or it will not be rotating and held stationary. Input 12 may be coupled to a motor that can be turned on and off to alternatively provide a rotating force and no rotating force to input 12. Output 16 may then be coupled to a device, such as a gear that will move a door. When the motor coupled to input 12 is off, input engaging clutch 10 is disengaged such that input 12 and output 16 are not coupled together. Input 12 is in a stationary mode when the motor is off. When the motor is turned on, however, input 12 changes to a rotating mode. With the motor on, input 12 is forced to rotate causing input engaging clutch 10 to be engaged, that is, input 12 and output 16 are coupled such that output 16 rotates with input 12.

Figure 2:
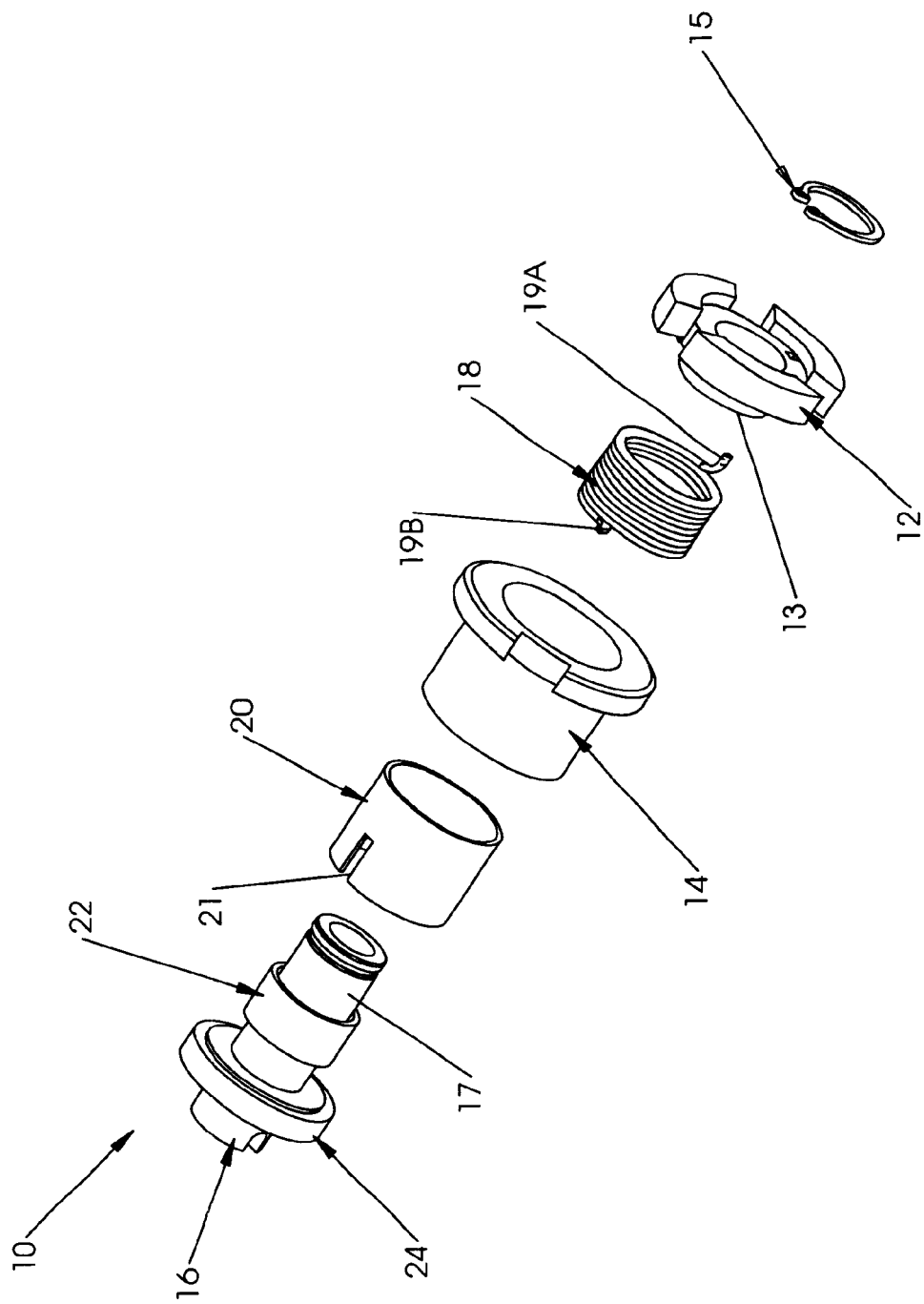
FIG. 2 is an exploded view of the input engaging clutch of FIG. 1.

FIG. 2 shows and exploded view of input engaging clutch 10 in accordance with the present invention. Input engaging clutch 10 includes input 12, case 14, retaining ring 15, output 16, output shaft 17, wrap spring 18, spring sleeve 20, output hub 22, and end cap 24. Output hub 22 and end cap 24 are press fit onto, and thus integral with, output shaft 17. When clutch 10 is fully assembled, retaining ring 15 helps to hold the assembly together.

Wrap spring 18 is a helical-wound spring having a relaxed condition defining a relaxed internal diameter. Input 12 includes input hub 13, which has an external hub diameter. The internal diameter of wrap spring 18 in its relaxed condition is less than the external diameter of input hub 13. Consequently, when wrap spring 18 is placed over input hub 13 it is in interference fit therewith. Thus, wrap spring 18 rotates with input 12 when input 12 is rotated. Wrap spring 18 may also include a first spring toe 19A, which can be engaged with input 12 in order to further ensure that when input hub 12 is rotating, wrap spring 18 is also rotating because of their engagement.

When input engaging clutch 10 is fully assembled and input 12 is not rotating, wrap spring 18 is in an equilibrium state. Wrap spring 18 has a second spring toe 19B, which is configured to fit into slot 21 in spring sleeve 20. Spring sleeve 20 is configured to rotate with input 12 when input 12 is rotating, because of the interconnection of input 12, wrap spring 18, second spring toe 19B, and spring sleeve 20. Output shaft 17, however, is disengaged from input 12 when wrap spring 18 is in its equilibrium state. In its equilibrium state, the inside diameter of wrap spring 18 is larger than the outer diameter of output hub 22. Consequently, when wrap spring 18 is in its equilibrium state, output shaft 17 may freely rotate within wrap spring 18 without interference therewith.

Wrap spring 18 may be wrapped open or wrapped down out of its equilibrium state into a flexed state. When spring 18 is wrapped down, its internal diameter will be smaller than its equilibrium internal diameter. When spring 18 is wrapped open, its internal diameter will be larger than its equilibrium internal diameter. Input clutch 10 may take advantage of wrap spring 18 changing from its equilibrium state to its flexed state to engage input 12 with output 16. For example, wrap spring 18 can be caused to wrap down onto output hub 22 such that rotation of input 12 will cause rotation of output shaft 17.

Figure 3B:
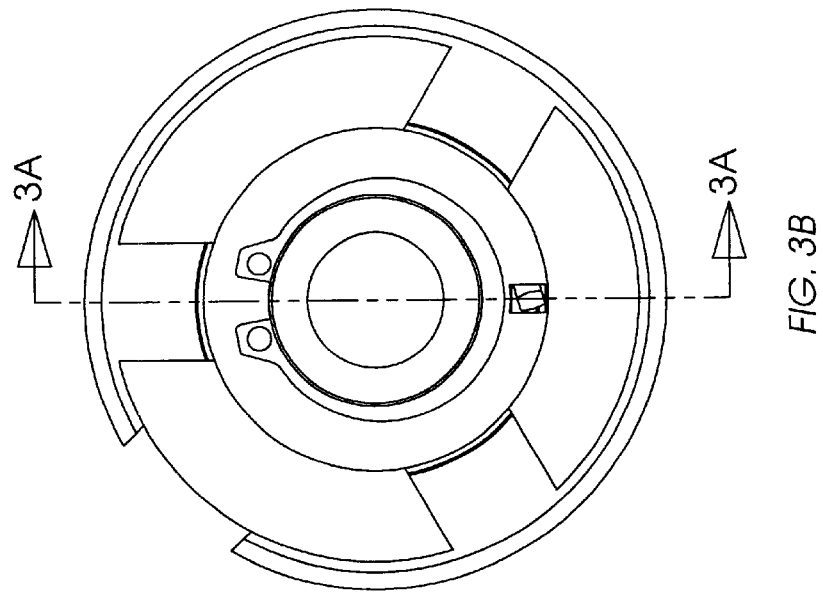
FIG. 3B is an end view indicating the cross-section of FIG. 3A.
Figure 3A:
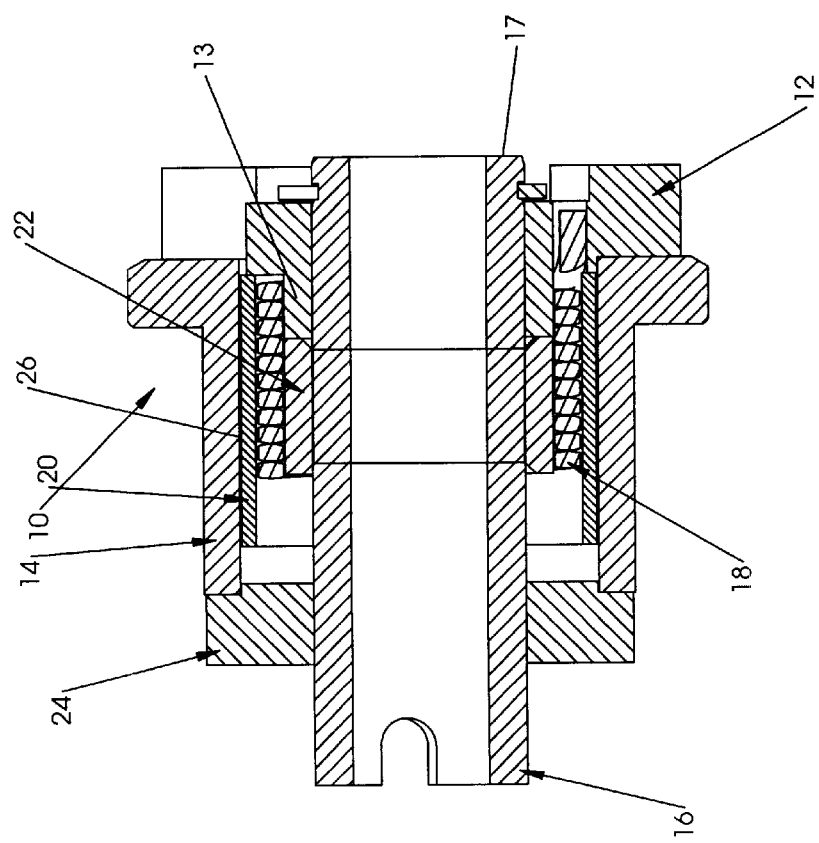
FIG. 3A is a cross-sectional view of the input engaging clutch of FIG. 1.

FIG. 3 shows a cross-section of input engaging clutch 10 fully assembled. Input engaging clutch 10 includes input 12, input hub 13, case 14, output 16, output shaft 17, wrap spring 18, output hub 22, end cap 24, and viscous fluid 26. In operation, input engaging clutch 10 maybe used to alternatively engage and disengage input 12 and output 16 in response to input 12 alternating between rotating mode and stationary mode.

When input engaging clutch 10 is fully assembled, viscous fluid 26 is contained in the area between case 14 and spring sleeve 20, thereby surrounding spring sleeve 20. When input 12 is in a rotating mode, input 12 rotates wrap spring 18 and spring sleeve 20, because of their interconnection. Viscous fluid 26 in the area between spring sleeve 20 and case 14 supplies drag torque to the outside diameter of spring sleeve 20 opposing its rotation. The drag torque on spring sleeve 20 supplied by viscous fluid 26 varies with the speed at which input 12 is rotating and with the viscosity of viscous fluid 26. In some cases, for example at very low rotating speeds for input 12 and low viscosity of viscous fluid 26, the drag torque on the outside diameter of spring sleeve 20 may not be enough to cause wrap spring 18 to wrap down on output hub 22. With sufficient rotating speed and viscosity, however, this drag torque caused by viscous fluid 26 acting on the outside diameter of spring sleeve 20 is sufficient to cause wrap spring 18 to transition from its equilibrium state to its flexed state. Specifically, the drag torque on the outside diameter of spring sleeve 20 will cause wrap spring 18 to wrap down across input hub 13 and output hub 22 thereby engaging clutch 10.

When input 12 transitions from rotating mode to stationary mode and thus stops rotating, the drag torque from viscous fluid 26 dissipates. Wrap spring 18 meanwhile, has stored energy in its flexed state having wrapped down on input hub 13 and output hub 22 with the rotating of input 12. When input 12 stops rotating, this stored energy in wrap spring 18 tends to cause wrap spring 18 to unwind. This stored energy in wrap spring 18 is dissipated through the rotation of spring sleeve 20 within fluid 26. Thus, wrap spring 18 transitions from its flexed state back to its equilibrium state when input 12 transitions from its rotating mode to its stationary mode. This small amount of rotation of wrap spring 18 and spring sleeve 20 releases output hub 22 from engagement with wrap spring 18, thereby disengaging clutch 10.

In this way, when an input turning force is applied to input 12 at a speed above the threshold speed, clutch 10 is engaged, that is, input 12 and output shaft 17 rotate together. When input 12 stops turning, input engaging clutch 10 is disengaged, that is, output hub 22 and output shaft 17 can rotate independently of input 12. In this disengaged state, output shaft 17 rotates freely within wrap spring 18. The disengagement of clutch 10 does not rely on counter-rotation of input 12.

Input engaging clutch 10 can be used in applications where it is desirable to have a clutch engaged whenever a rotating force is applied to the input and disengaged when that rotating stops. For example, in some applications a turning force can be applied to input 12 of input engaging clutch 10 through some type of turning gear. When that gear rotates, input 12 will also rotate causing wrap spring 18 to wrap down across input hub 13 and output hub 22 causing output shaft 17 to rotate with input 12. In some configurations, when this gear-type force supplied to input 12 stops rotating, input 12 is prevented from rotating in a direction opposite to the direction in which it was originally driven. In this way, the stored energy in wrap spring 18 cannot be dissipated by allowing input 12 to counter-rotate and unwind wrap spring 18. Instead, input engaging clutch 10 allows wrap spring 18 to unwind by rotating spring sleeve 20. When wrap spring 18 is allowed to unwind by moving spring sleeve 20, output shaft 17 is released and input engaging clutch 10 is disengaged. As long as the stored energy in wrap spring 18 is sufficient to overcome the drag torque provided by viscous fluid 26 on the fin outside diameter of spring sleeve 20, wrap spring 18 can wrap open and release output shaft 17.

Clutch 10 can be used to alternatively automatically and manually move a vehicle door. A drive motor connected to input 12 can be activated to drive a gear connected to output 16 that drives the door to automatically move. When the drive motor is deactivated, clutch 12 disengages thereby allowing the door to be moved manually without interference from the drive motor connected to input 12.

Clutch 10 can also be used as an amplified damper. For example, clutch 10 can be configured for use as a lid damper to provide a constant speed of closing for the lid relative to a base or ground. In this way, input 12 is connected to the lid to be closed, and case 14 and output 16 are connected to ground. As the lid tends to close relative to ground due to gravity acting on its mass, input 12 will be rotated. Because spring 18 will wrap down on output 16 for higher speeds of input 12 rotation, clutch 10 provides a limit on the closing speed of the lid. Spring sleeve 20 rotating within viscous fluid 26 provides a resistance to the lid closing providing desirable closing characteristics for the lid.

Figure 4:
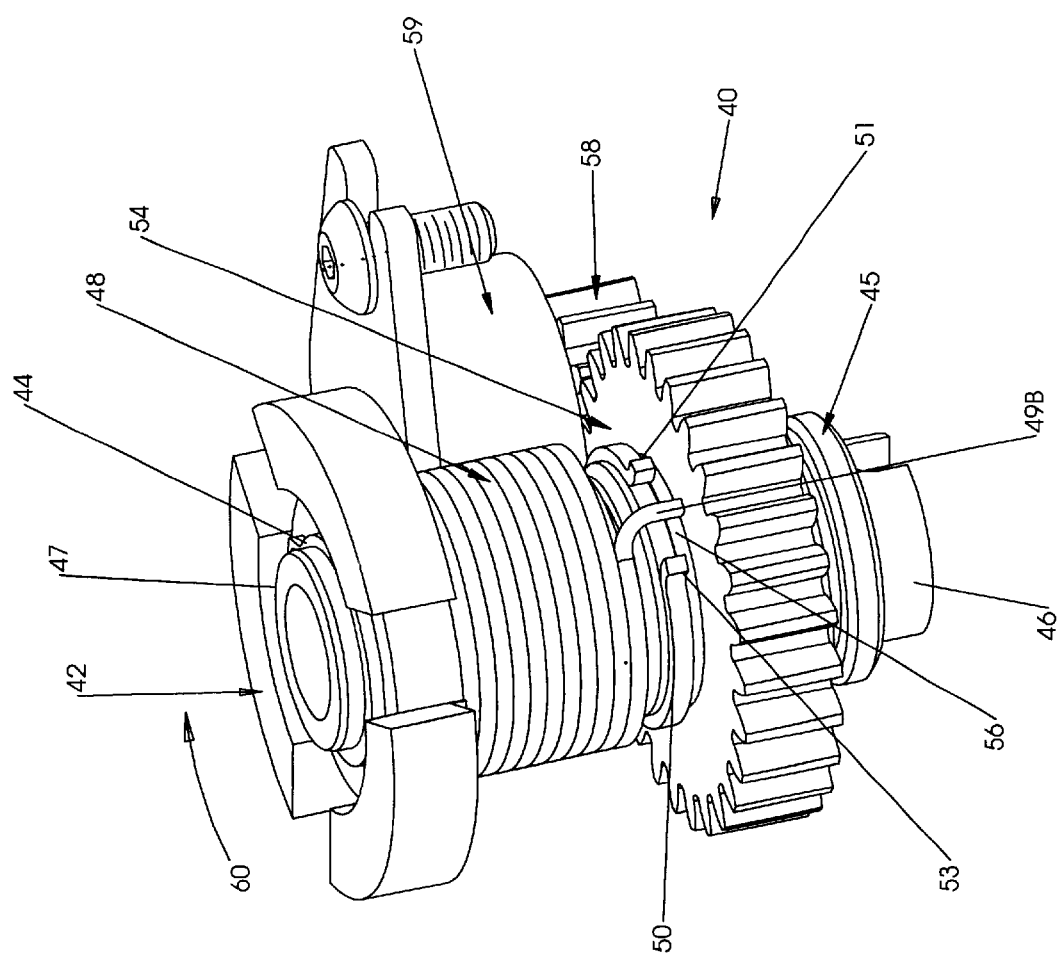
FIG. 4 is a perspective view of an alternative embodiment of an input engaging clutch in accordance with the present invention.
Figure 5:
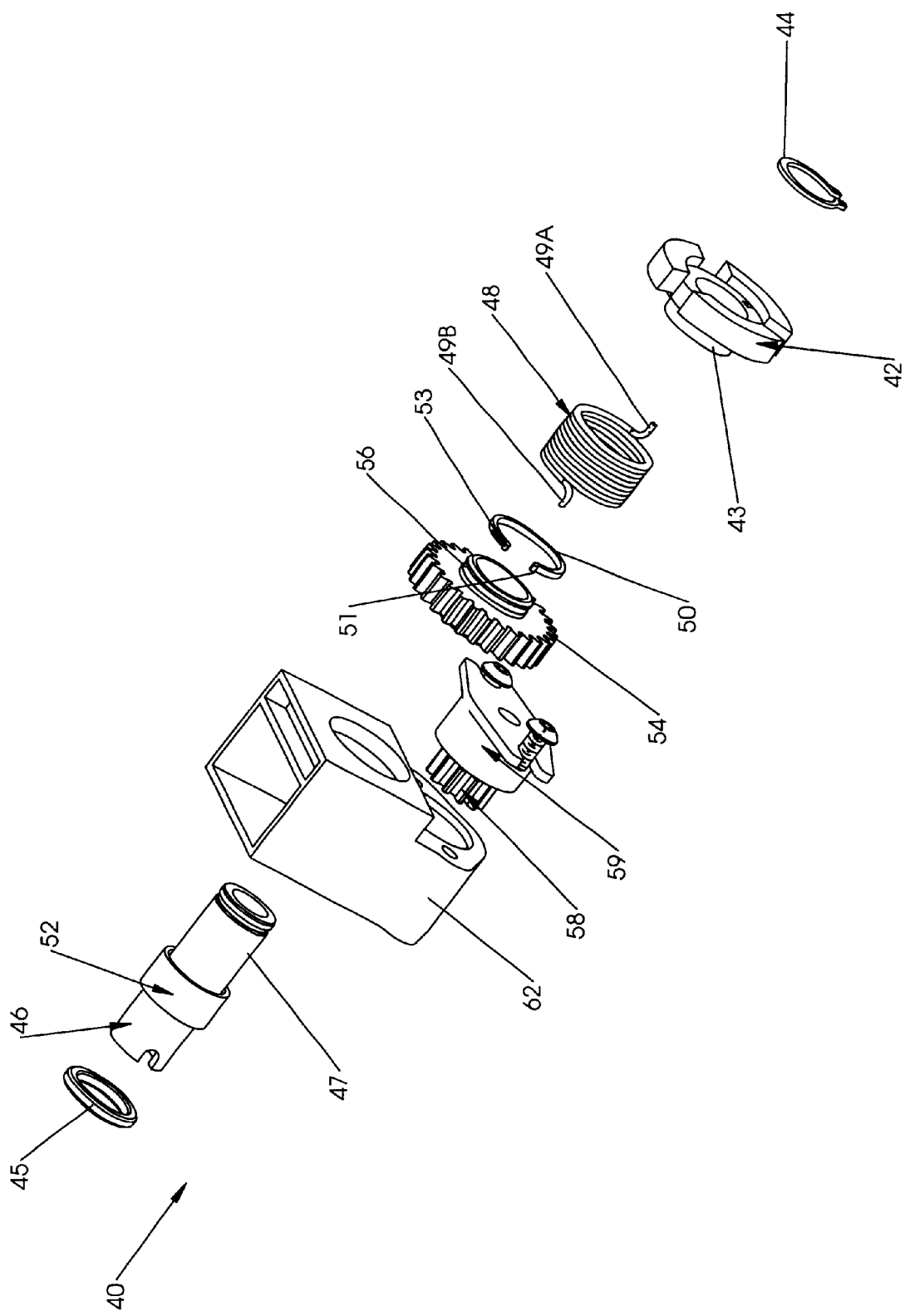
FIG. 5 is an exploded view of the input engaging clutch of FIG. 4.

FIGS. 4–6 show alternative input engaging clutch 40 in accordance with the present invention. Clutch 40 includes input 42, input hub 43, retaining ring 44, press ring 45, output 46, output shaft 47, wrap spring 48, drag spring 50, output hub 52, gear 54, gear hub 56, damper gear 58, rotary damper 59, and housing 62. In operation, input engaging clutch 40 may be used to alternatively engage and disengage input 42 with output 46 in response to alternatively rotating and holding stationary input 42.

Input engaging clutch 40 may be used in the same way as input engaging clutch 10. For example, input 42 may be coupled to a motor that can be turned on and off to alternatively provide a rotating force and no rotating force to input 42. Output 46 may then be coupled to a device, such as a gear that will move a door. When the motor coupled to input 42 is off, input 42 is in a stationary mode and will not rotate. In this mode, input engaging clutch 40 is disengaged such that input 42 and output 46 are not coupled together. When the motor is turned on, however, input 42 transitions to a rotating mode. Input 42 is forced to rotate causing input engaging clutch 40 to be engaged, that is, input 42 and output 46 are coupled such that output shaft 47 rotates with rotation of input 42.

Wrap spring 48 is coupled to input 42 via input hub 43 similarly to wrap spring 18 and input engaging clutch 10 described above. Wrap spring 48 has a relaxed internal diameter when in a relaxed condition. The internal diameter of wrap spring 48 in its relaxed condition is smaller than the diameter of input hub 43. In this way, when clutch 40 is fully assembled wrap spring 48 is frictionally engaged with input 42, and specifically engaged with input hub 43.

Alternatively, or in addition, wrap spring 48 may have a first spring toe 49A that engages input 42 thereby further connecting wrap spring 48 and input 42. In this way, wrap spring 48 rotates with rotation of input 42.

Wrap spring 48 includes second spring toe 49B, which is configured to engage drag spring 50 when clutch 40 is fully assembled. Drag spring 50 also has a relaxed internal diameter when in a relaxed condition. The internal diameter of drag spring 50 in its relaxed condition is smaller than the external diameter of gear hub 56. In this way, when drag spring 50 is assembled over gear hub 56, it is frictionally engaged therewith. Gear hub 56 is integral with gear 54. Drag spring 50 includes drag spring toes 51 and 53. Gear 54 includes a plurality of teeth. Damper gear 58 also includes a plurality of teeth that are configured to engage the teeth of gear 54. Damper gear 58 is mounted to rotary damper 59, which provides a relatively steady resistance to the rotating of damper gear 58. When clutch 40 is fully assembled, press ring 45 and retaining ring 44 help to hold the assembly together.

In operation, clutch 40 alternately engages and disengages input 42 to output 46. When clutch 40 is fully assembled and input 42 is not rotating, wrap spring 48 is in an equilibrium state. When input 42 is in rotating mode, it rotates and wrap spring 48 also rotates with input 42 because of their interconnection. When input 42 is rotating clockwise in the direction 60 (shown in FIG. 4), wrap spring 48 also rotates in that same direction 60. When input 42 is rotating in direction 60, second spring toe 49B engages drag spring toe 53 of drag spring 50. This tends to rotate drag spring 50 in the same direction 60 as input 42 and wrap spring 48. Gear 54 tends to rotate in the same direction 60 as input 42 because of the interference fit between drag spring 50 and gear hub 56. Because of the interconnection of the teeth on gear 54 and the teeth on damper gear 58, damper gear 58 tends to rotate in a counter-clockwise direction opposite direction 60. Damper gear 58 is coupled to rotary damper 59, which is configured to supply a drag torque such that damper gear 58 provides a resistance to rotation of gear 54.

For very slow speeds of rotation of input 42 and sufficiently low levels of drag torque supplied by damper gear 58 and rotary damper 59, second spring toe 49B of wrap spring 48 may rotate drag spring 50 via drag spring toe 53 sufficiently to prevent wrap spring 48 from wrapping down on output hub 52. However, with significant speeds of rotation of input 42 and with damper gear 58 and rotary damper 59 configured to provide significant drag torque, second spring toe 49B of wrap spring 48 will not be able to rotate drag spring 50 and gear 54 at a high enough rate of rotation to prevent wrap spring 48 from wrapping down across input hub 43 and output hub 52. Thus, wrap spring 48 will transition from its equilibrium state to its flexed state. When wrap spring 48 wraps down across input hub 43 and output hub 52, clutch 40 is engaged and output shaft 47 will rotate with rotation of input 42. When input 42 transitions from its rotating mode to its stationary mode, the energy stored in wrap spring 48 from having wrapped down across output hub 52 tends to dissipate. This stored energy will dissipate by wrap spring 48 wrapping open from its flexed state back to its equilibrium state. Since input 42, in many cases, is prevented from rotating in a direction opposite the original direction of rotation 60, when wrap spring 48 wraps open second spring toe 49B will rotate against drag spring toe 53 and thereby rotate drag spring 50, gear 54, and gear hub 56 in direction 60, the same direction that input 42 was originally rotated. Damper gear 58 is then rotated in a direction opposite direction 60 because of the interaction of the teeth on gear 54 and on damper gear 58. When wrap spring 48 wraps open from its flexed state to its equilibrium state, clutch 40 is disengaged. That is, when wrap spring 48 is in its equilibrium state output shaft 47 may freely rotate within wrap spring 48 and independent of input 42.

Input clutch 40 has an additional feature not provided in clutch 10. The inclusion of drag spring 50 between wrap spring 48 and gear 54 for input clutch 40 allows for slippage between wrap spring 48 and gear 54 in clutch 40 that does not occur between wrap spring 18 and spring sleeve 20 in clutch 10. In this way, for clutch 10, the speed at which input 12 rotates is controlling over the speed at which spring sleeve 20 rotates within viscous fluid 26. For clutch 40, however, the slippage between wrap spring 48 and gear 54 provides that the speed at which gear 54 rotates is a function of both the speed at which input 42 is rotated and by the interference fit between drag spring 50 and gear hub 56. For very slow rotational speeds of input 42, gear 54 will rotate with input 42 when there is no slippage between drag spring 50 and gear hub 56. Once sufficient speed of rotation is established for input 42, however, drag spring 50 will start slipping with respect to gear hub 56. Once drag spring 50 is slipping with respect to gear hub 56, the rotational speed of gear 54 will remain constant even though the rotation of 42 is continually increased.

Although not necessary to the invention, this slippage of drag spring 50 within clutch 40 may have advantages in some applications. For example, rotary damper 59 will likely only function properly for a range of rotational speeds of rotary gear 58, including some maximum acceptable rotational speed. In some cases, input 42 may rotate at significantly higher rotational speeds than is acceptable for rotary gear 58. In those cases where it is also not practicable to adjust the gear ratio to accommodate the speed differential, this slippage of drag spring 50 within clutch 40 can provide a good solution.

The amount that wrap spring 48 must rotate before it will wrap down onto output hub 46 is known as the wrap down angle. The larger this wrap down angle, the more energy will be stored in spring 48. The energy stored in spring 48 in its flexed state is sufficient to overcome the drag torque from damper gear 58 and rotary damper 59 such that the transition of spring 48 from its flexed state to its equilibrium state will rotate gear 54 and damper gear 58 thereby disengaging clutch 40. Any number of rotary dampers are acceptable for damper gear 58 and rotary damper 59. Examples of off-the-shelf rotary dampers that are acceptable for the present invention are models FRT-C2, FRN-C2, FRT-D2 and FRN-D2 from Ace Controls International. These types of dampers contain a viscous fluid that causes the damper to have speed-dependent resistance to rotation. One skilled in the art will understand that any number of configurations that will provide resistance to rotation are acceptable for use as a damper in the present invention.

Input engaging clutch 40 can also be modified in accordance with the present invention such that it operates as an input engaging clutch that is engaged when input 42 is in its stationary mode and is disengaged when input 42 transitions to its rotating mode. This opposite result from clutch 40 described above is essentially achieved by having wrap spring 48 wrapped down onto input hub 43 and output hub 52 in its equilibrium state, and by moving gear 54 and rotary damper 58 relative to the input 43. When input 43 transitions from its stationary mode to its rotating mode, wrap spring 48 wraps open off of output hub 52 into its flexed state. In this flexed state, output hub 52 may freely rotate within wrap spring 48 and modified clutch 40 is disengaged. When input 43 transitions from its rotating mode to its stationary mode, wrap spring 48 wraps back down onto output hub 52 to its equilibrium state. In this equilibrium state, output hub 52 is coupled to wrap spring 48 and modified clutch 40 is engaged.

Such a modified input engaging clutch 40 may be used in a variety of applications. For example, it can be used in conjunction with a braking system for a wheeled cart. Input 42 may be coupled to a wheel that will alternatively rotate and be held stationary as the cart is moved and held stationary. Output shaft 47 may then be fixed to the cart or ground such that it cannot rotate. When the wheel coupled to input 42 is not rotating, input 42 is in a stationary mode and will not rotate. In this mode, modified input engaging clutch 40 is engaged such that input 42 and output 46 are coupled together. Since output shaft 47 is fixed and cannot rotate, modified clutch 40 acts as a brake when input 42 is in the stationary mode. When the wheel is rotated, however, input 42 transitions to a rotating mode. Input 42 is forced to rotate with the wheel causing modified input engaging clutch 40 to be disengaged, that is input 42 and output shaft 47 are no longer coupled such that output shaft 47 is no longer coupled to input 42. This release of input 42 from output shaft 47 in the rotating mode of input 42 causes the release of the brake effect that existed when input 42 was in the stationary mode.

Such a modified input engaging clutch 40 could also be employed to be used in an overload condition. For example, a traditional electric spring clutch may be used in normal operating conditions and a modified clutch 40 could be coupled in to be engaged when an overload condition is reached such that rotation of the input 42 of modified clutch 40 would disengage the output 46 and release modified clutch 42 from ground in this overloaded condition.

Figure 7:
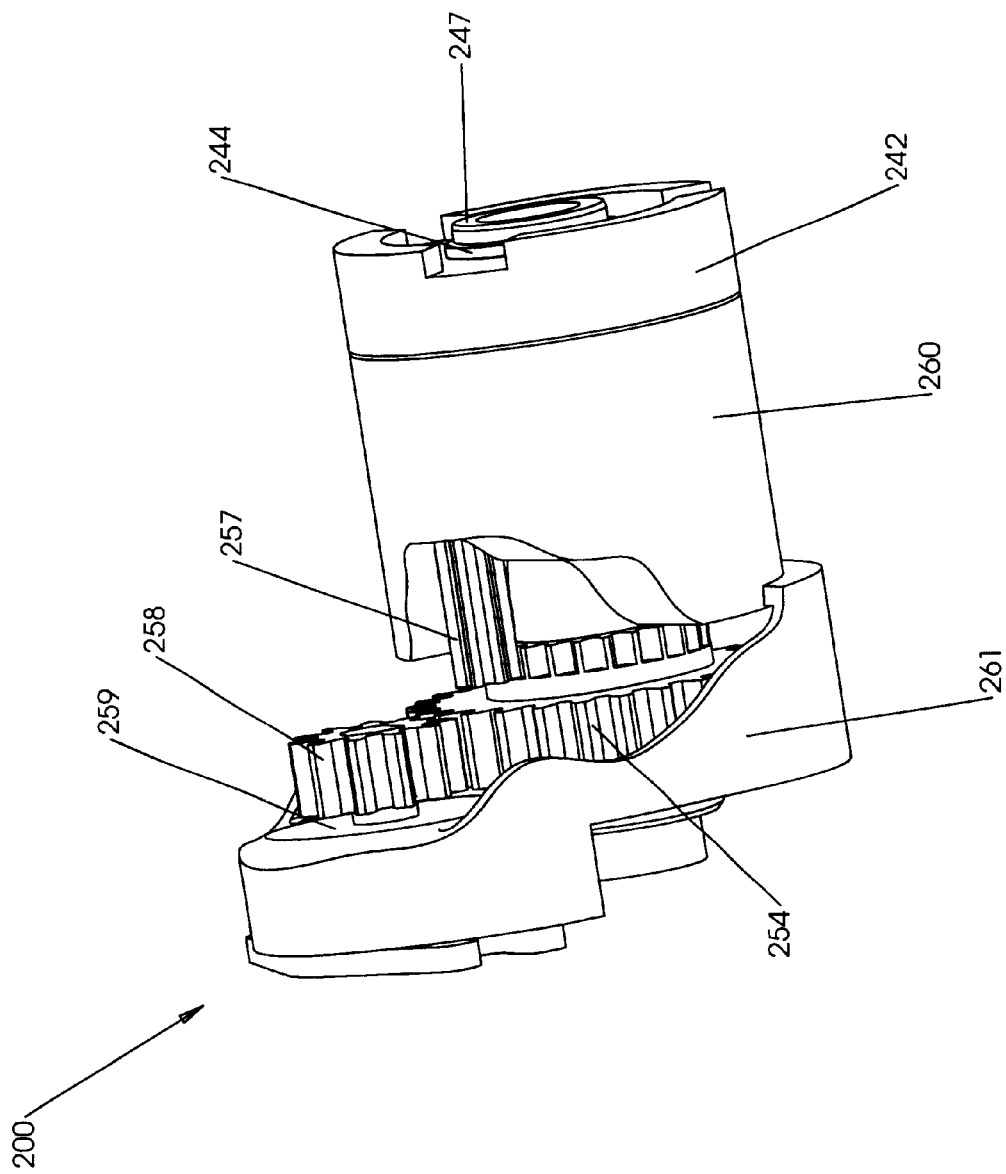
FIG. 7 is a perspective view of an alternative input engaging clutch in accordance with the present invention.
Figure 8:
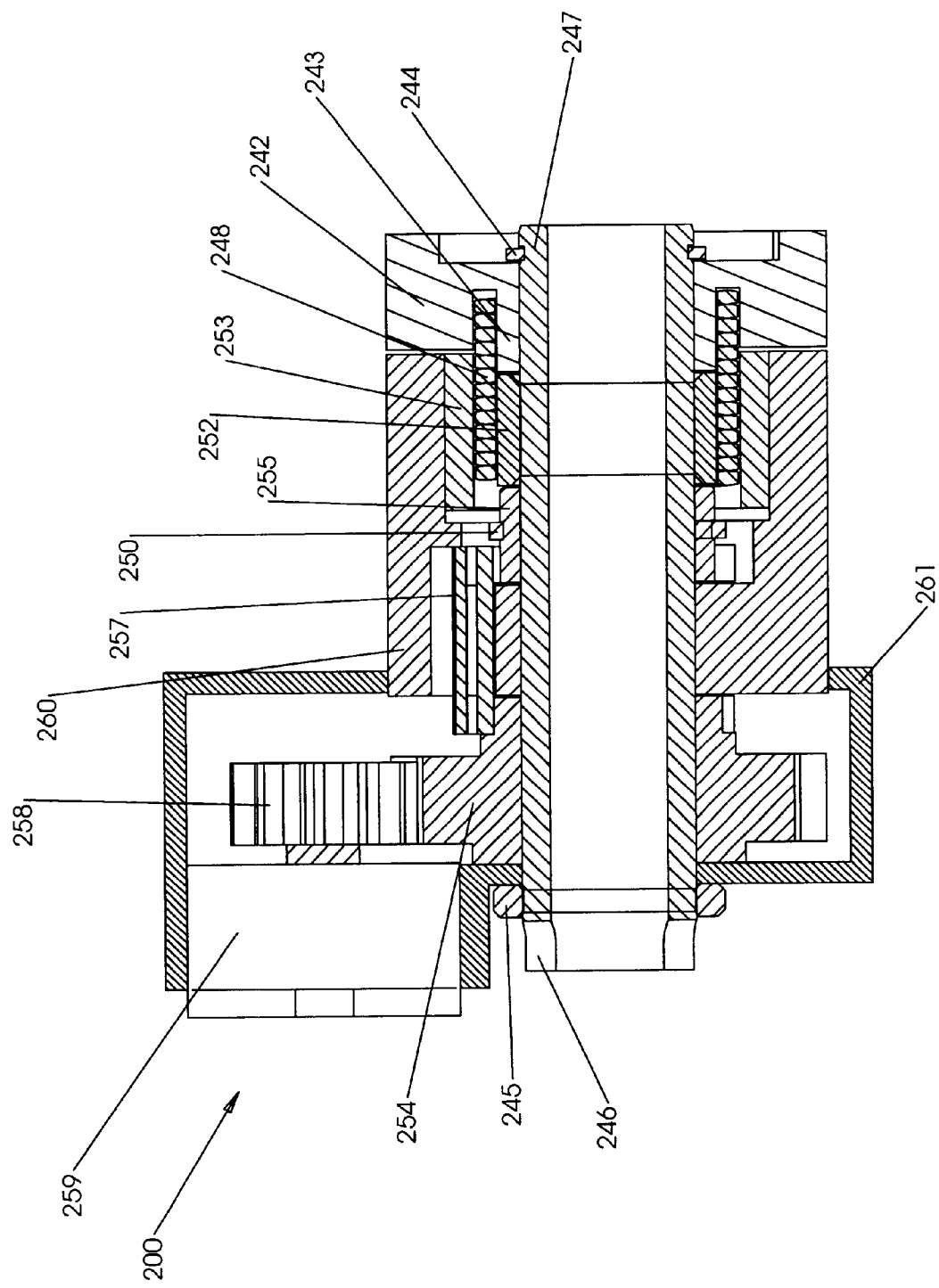
FIG. 8 is a cross-sectional view of the input engaging clutch of FIG. 7.

FIGS. 7 and 8 shows alternative bi-directional input engaging clutch 200 in accordance with the present invention. Clutch 200 includes input 242, input hub 243, retaining ring 244, press ring 245, output 246, wrap spring 248, drag spring 250, outer gear 254, inner gear 255, pinion gear 257, damper gear 258, rotary damper 259, input housing 260, and case 261. Output 246 includes output shaft 247, inner drum hub 252 and outer drum hub 253, all of which are integral, and thus, rotate together.

Input engaging clutch 200 operates similarly to input engaging clutch 40, except that input engaging clutch 200 maybe operated in a bi-directional manner. Specifically, input 242 can be coupled to a drive force that alternatively rotates input 242 in a clockwise and a counter-clockwise direction. Output 246 may be coupled to a device, such as a gear that will open and close a door. When the drive force coupled to input 242 is off, input 242 is in a stationary mode and will not rotate. In this mode, input engaging clutch 200 is disengaged such that input 242 and output 246 are not coupled together. When the drive force is supplied, however, input 242 transitions to a rotational mode. When input 242 is forced to rotate, in either a clockwise or a counter-clockwise direction, input engaging clutch 242 will be engaged, that is, input 242 and output 246 are coupled such that output shaft 247 rotates with input 242.

Wrap spring 248 is coupled to input 242 such that rotation of input 242 also rotates wrap spring 248. Input 242 has a circular groove cut into input hub 243 such that wrap spring 248 may be press fit into the groove on input hub 243. Press fitting wrap spring 248 to input 242 ensures that wrap spring 248 will continue to rotate with input 242, regardless of the direction of rotation of input 242. Wrap spring 248 can be connected to input 242 in any of a variety of ways, one of which is described in detail in U.S. Pat. No. 4,638,899 (Kossett) entitled Simplified Method of Securing the Clutch Spring to the Torque Input Drum of a Spring Clutch, and Resulting Mechanism, which is incorporated by reference herein.

Similar to that described with respect to input engaging clutch 40, wrap spring 248 of input engaging clutch 200 includes a spring toe (not shown in FIG. 8) which is configured to engage drag spring 250. The internal diameter of drag spring 250 in its relaxed condition is smaller than the external diameter of inner gear 255. In this way, drag spring 250 is frictionally engaged with inner gear 255 when clutch 200 is filly assembled. Inner gear 255 is configured to engage pinion gear 257 upon rotation of inner gear 255. In a preferred embodiment, both inner gear 255 and pinion 257 have teeth that will engage upon rotation. Pinion gear 257 is configured to engage outer gear 254. Outer gear 254 similarly has teeth that are configured to engage teeth on pinion gear 257. Finally, damper gear 258 also has teeth that are configured to engage outer gear 254. When clutch 200 is fully assembled, retaining ring 244 and press ring 245 help to hold the assembly together. Housing 260 surrounds and protects a portion of clutch 200 and is coupled to outer drum hub 253 such that it rotates with output 246. Case 261 surrounds and protects outer gear 254 and rotary damper 259.

In operation, clutch 200 alternatively engages and disengages input 242 to output 246. When input 242 is rotating, in either a clockwise or counter-clockwise direction, it is in a rotating mode. In this rotating mode wrap spring 248 also rotates with input 242 because of their interconnection. Rotating wrap spring 48 also rotates drag spring 250 because of the engagement of the respective spring toes (not shown in FIG. 8) of drag spring 250 and wrap spring 248. This engagement of spring toes is not shown in FIG. 8, but is essentially the same as that shown by spring toes 49B, 51, and 53 in FIG. 4, and as explained in conjunction with clutch 40 above. Thus, rotating wrap spring 248 also rotates, drag spring 250, which in turn rotates inner gear 255, which in turn rotates pinion gear 257, which in turn rotates outer gear 254, which in turn rotates damper gear 258, all because of the interconnection of the respective teeth on these gears. Damper gear 258 is coupled to rotary damper 259, which is configured to supply a relatively steady drag torque such that damper gear 258 provides a relatively steady resistance to rotation. When input 242 is rotated in a clockwise direction at a sufficient speed of rotation, rotary damper 259 through damper gear 258, outer gear 254, pinion gear 257, inner gear 255, and drag spring 250, will cause wrap spring 248 to wrap down onto inner drum hub 252. When wrap spring 248 wraps down onto inner drum hub 252, clutch 200 is engaged, that is, output 256 and output shaft 257 rotate with input 242. Similarly, when input 242 is rotated counter-clockwise at a sufficient speed of rotation, rotary damper 259 provides sufficient drag torque, through damper gear 258, outer gear 254, pinion gear 257, inner gear 255, and drag spring 250, to cause wrap spring 248 to wrap open against outer drum hub 253. In this way, counterclockwise rotation of input 242 engages clutch 200, that is, output 246 and output shaft 247 rotate with input 242.

When input 242 transitions from its rotating mode (in either clockwise or counter-clockwise rotation) to its stationary mode, the energy stored in wrap spring 248 from having flexed, either by wrapping down onto inner drum hub 252, or by having wrapped open against outer drum hub 253, will tend to dissipate. This stored energy will dissipate through wrap spring 242 wrapping open or wrapping down from its flexed state to its equilibrium state. Since input 242, in many cases, is prevented from rotating in a direction opposite the original direction of rotation, when wrap spring 242 wraps open or wraps down, the spring toe on wrap spring 248 will engage the spring toe on drag spring 250 thereby rotating drag spring 250, inner gear 255, pinion gear 257, outer gear 254, and damper gear 258. This rotation allows wrap spring 248 to return to its equilibrium state such that clutch 200 is disengaged, that is, output 246 may rotate independently of input 242.

Although the present invention has been described with reference to preferred embodiments, workers skilled in the art will recognize that changes may be made in form and detail without departing from the spirit and scope of the invention.

What is claimed is:

1. A clutch comprising:
   a rotatable input;
   a spring having an equilibrium state and a flexed state, the spring being coupled to the input such that the spring rotates with the input when the input rotates;
   a damper mechanism coupled to the spring such that the damper mechanism causes the spring to change from its equilibrium to its flexed state when the input transitions from stationary to rotational, and such that the damper mechanism allows the spring to change from its flexed to its equilibrium state when the input transitions from rotational to stationary; and
   a rotatable output positioned relative to the spring such that the output synchronously rotates with the input when the spring is in its flexed state, and rotates independently of the input when the spring is in its equilibrium state.

2. The clutch of claim 1, wherein the rotatable output includes an output hub within the spring such that when the input changes from stationary to rotational, the spring wraps down onto the output hub thereby engaging the clutch.

3. The clutch of claim 2, wherein the output hub within the spring is configured such that when the input changes from rotational to stationary, the spring wraps open off the output hub thereby disengaging the clutch.

4. The clutch of claim 3, wherein the spring wraps open off the output hub by rotating the damper mechanism and without rotating the input.

5. The clutch of claim 4, wherein the damper mechanism comprises a spring sleeve that is coupled to the spring and that is surrounded by a viscous fluid.

6. The clutch of claim 4, wherein the damper mechanism comprises a rotary damper that is coupled to the spring by at least one gear.

7. The clutch of claim 6, wherein the rotary damper provides resistance to rotation.

8. The clutch of claim 1, wherein the rotatable output includes an output hub surrounding the spring such that when the input changes from stationary to rotational, the spring wraps open against the output hub thereby engaging the clutch.

9. The clutch of claim 8, wherein the output hub surrounding the spring is configured such that when the input changes from rotational to stationary, the spring wraps down off of the output hub thereby disengaging the clutch.

10. A clutch comprising:
    a rotatable input having a first mode and a second mode;
    a spring having a first state and a second state, the spring coupled to the input such that each time the input changes modes the spring changes states;
    damper means coupled to the spring for allowing the spring to change states without rotating the input; and
    a rotatable output positioned relative to the spring such that the output synchronously rotates with the input when the spring is in the first state and rotates independently of the input when the spring is in the second state.

11. The clutch of claim 10, wherein the input is stationary in the first mode and rotating either clockwise or counter-clockwise in the second mode.

12. The clutch of claim 11, wherein the rotatable output includes an output hub within the spring such that when the input changes from stationary to rotating, the spring wraps down onto the output hub thereby engaging the clutch.

13. The clutch of claim 12, wherein the output hub within the spring is configured such that when the input changes from rotating to stationary, the spring wraps open off the output hub thereby disengaging the clutch.

14. The clutch of claim 13, wherein the spring wraps open off the output hub by rotating the damper means and without rotating the input.

15. The clutch of claim 14, wherein the damper means comprises a spring sleeve that is surrounded by a viscous fluid, the spring sleeve being coupled to the spring.

16. The clutch of claim 10, wherein the input is stationary in the first mode and rotating in the second mode and wherein the rotatable output includes an output hub within the spring such that when the input changes from stationary to rotating, the spring wraps open off the output hub thereby disengaging the clutch.

17. The clutch of claim 16, wherein the output hub within the spring is configured such that when the input changes from rotating to stationary, the spring wraps down onto the output hub thereby engaging the clutch.

18. A clutch comprising:
    a rotatable input having a first mode and a second mode;
    a spring having an equilibrium state and a flexed state, the spring coupled to the input such that each time the input changes modes the spring changes states;
    a rotary damper coupled to the spring such that the damper mechanism allows the spring to change states without rotating the input; and
    a rotatable output positioned relative to the spring such that the output synchronously rotates with the input when the spring is in the first state and rotates independently of the input when the spring is in the second state.

19. The clutch of claim 18, wherein the rotary damper is coupled to the spring through at least one gear.

20. The clutch of claim 19, wherein a drag spring provides slippage between the rotary damper and the spring.

* * * * *